United States Patent [19]
Horiuchi et al.

[11] Patent Number: 5,710,903
[45] Date of Patent: Jan. 20, 1998

[54] DATA PROCESSING SYSTEM PROVIDED WITH AN ADDRESS TRANSLATION LOOKASIDE BUFFER CAPABLE OF QUICK PARTIAL PURGE OPERATION

[75] Inventors: Taiji Horiuchi; Kuniki Toubaru; Hiromichi Kainou, all of Hadano, Japan

[73] Assignees: Hitachi, Ltd., Chiyodaku; Hitachi Computer Engineering Co., Ltd., Kanagawa-Ken, both of Japan

[21] Appl. No.: 401,745

[22] Filed: Mar. 9, 1995

[30] Foreign Application Priority Data

Mar. 10, 1994 [JP] Japan .................................. 6-039806

[51] Int. Cl.$^6$ ........................................ G06F 12/12
[52] U.S. Cl. ................ 395/401; 395/417; 395/483; 395/486
[58] Field of Search ................ 395/460, 461, 395/462, 471, 483, 486, 415; 364/DIG. 1

[56] References Cited

U.S. PATENT DOCUMENTS

| | | | |
|---|---|---|---|
| 4,068,303 | 1/1978 | Morita | 395/417 |
| 4,939,641 | 7/1990 | Schwartz et al. | 395/473 |
| 5,031,096 | 7/1991 | Jen et al. | 395/496 |
| 5,226,130 | 7/1993 | Favor et al. | 395/375 |
| 5,317,710 | 5/1994 | Ara et al. | 395/417 |
| 5,349,672 | 9/1994 | Nishimukai et al. | 395/450 |

*Primary Examiner*—Tod R. Swann
*Assistant Examiner*—J. Peikari
*Attorney, Agent, or Firm*—Jenner & Block

[57] ABSTRACT

A data processing system capable of simultaneously processing a plurality of partial purge requests stored in a purge address stack and of reducing the effective time necessary for carrying out a partial purge process for the partial purging of an address translation lookaside buffer is disclosed. The data processing system comprises a purge address stack (106) having a plurality of registers (106a to 106d) for storing a plurality of partial purge requests, a plurality of comparators (109a to 109d) associated with the registers of the purge address stack respectively and functioning for both gaining normal access to an address translation lookaside buffer and carrying out a partial purge process, and a comparator (110) to be used when an address translator (107) operates. The partial purge process is started when the purge address stack becomes full or when a real address portion determined by the address translator (107) coincides with any one of the real address portions stored in the registers of the purge address stack.

9 Claims, 4 Drawing Sheets

FIG. 3

ENCODER

| IN | | | | OUT | |
|---|---|---|---|---|---|
| 1 | 2 | 3 | 4 | 0 | 1 |
| 0 | 0 | 0 | 0 | 0 | 0 |
| 1 | 0 | 0 | 0 | 0 | 1 |
| * | 1 | 0 | 0 | 1 | 0 |
| * | * | 1 | 0 | 1 | 1 |

*···DIN'T CARE

FIG. 4

DECODER

| IN | | OUT | | | |
|---|---|---|---|---|---|
| 0 | 1 | 1 | 2 | 3 | 4 |
| 0 | 0 | 0 | 0 | 0 | 0 |
| 0 | 1 | 1 | 0 | 0 | 0 |
| 1 | 0 | 1 | 1 | 0 | 0 |
| 1 | 1 | 1 | 1 | 1 | 0 |

DATA PROCESSING SYSTEM PROVIDED WITH AN ADDRESS TRANSLATION LOOKASIDE BUFFER CAPABLE OF QUICK PARTIAL PURGE OPERATION

BACKGROUND OF THE INVENTION

1. Field of the Invention

The present invention relates to a data processing system of a virtual storage system and, more particularly, to a data processing system capable of shortening the effective processing time required for invalidating a specific entry to an address translation buffer.

2. Description of the Related Art

Generally, the data processing system of a virtual storage system is provided with an address translation lookaside buffer for storing a plurality of pairs of previously translated logical addresses by an address translator, dynamic address translation (DAT), and real addresses to carry out the translation of a logical address into a real address at a high speed. Upon the reception of a request for translating a logical address into a real address, the data processing system reads a real address associated with the logical address from the address translation lookaside buffer if the logical address is stored previously in the address translation lookaside buffer.

Incidentally, in the virtual storage system, if a real address allocated to a logical address is not used, the combination of the logical address and the real address needs to be changed by allocating the real address to another logical address. In such a case, an entry stored in the address translation lookaside buffer and associated with the real address must be invalidated by an process called a partial purge process. The partial purge process searches the address translation lookaside buffer for all the entries in a step-by-step search mode.

A recent data processing system of a virtual storage system is provided with an address translation lookaside buffer having an increased capacity and, accordingly, requires an increased time for searching the address translation lookaside buffer to carry out a partial purge process, and the throughput of the address translation process has become a problem.

A technique to solve this problem has been proposed in, for example, Japanese Patent laid-open (Kokai) No. 57-164485. This previously proposed technique divides an address translation lookaside buffer into a plurality of blocks along the columns and all the blocks are subjected collectively to the partial purge process to carry out the partial purge process quickly. Since all the blocks formed by dividing the address translation lookaside buffer along the columns are subjected collectively to the partial purge process, the address translation lookaside buffer must comprise a plurality of RAMs each having a small capacity. Nevertheless, it is generally efficient to use a RAM having a large capacity to improve the degree of integration of functional circuits, such as address translation lookaside buffers.

Since the previously proposed technique needs a plurality of RAMs each having a small capacity for forming the address translation lookaside buffer, it is difficult to form the address translation lookaside buffer in a high degree of integration and the degree of integration of the address translation lookaside buffer proper and an address translation lookaside buffer system including other devices is reduced and the quantity of the associated hardware increases accordingly when the capacity of the address translation lookaside buffer is increased.

SUMMARY OF THE INVENTION

Accordingly, it is an object of the present invention to provide a data processing system capable of solving the foregoing problem in the prior art and provided with an address translation lookaside buffer comprising an undivided large-capacity RAM, and capable of quickly searching the address translation lookaside buffer to carry out a partial purge process without dividing the RAM into blocks along the columns.

The present invention accumulates requests for the partial purging of the address translation lookaside buffer and carries out a plurality of cycles of a partial purge process collectively to achieve the object.

According to the present invention, a purge address stack holds a plurality of real addresses to be invalidated for the entries of an address translation lookaside buffer, a plurality of partial purge requests for the partial purging of the address translation lookaside buffer are accumulated in the purge address stack, and a plurality of cycles of a partial purge process are carried out collectively upon the increase of the partial purge requests to the capacity of the purge address stack.

The present invention employs a decision means for deciding, when registering a pair of a logical address and a real address translated by DAT in the address translation lookaside buffer, whether or not the real address to be stored in the address translation lookaside buffer is one that is specified by a partial purge request through the comparison of the translated real address and the contents of the purge address stack, and carries out the plurality of cycles of the partial purge process collectively for all the partial purge requests accumulated in the purge address stack before registering a new real address in the address translation lookaside buffer when decision means decides that the real address is that specified by the partial purge request.

When a partial purge request requesting the partial purging of the address translation lookaside buffer is given, an information processing system in accordance with the present invention stores a real address associated with an entry to be purged in the purge address stack, and carries out partial purge requested by a plurality of partial purge requests, on the basis of the real addresses stored in the purge address stack, when the purge address stack becomes full or when registering an entry of the address translation lookaside buffer having the same real address as that specified by the partial purge request.

When accessing the address translation lookaside buffer, the data processing system in accordance with the present invention invalidate a real address read from the address translation lookaside buffer and determines a real address by an address translator when it is decided that the real address read from the address translation lookaside buffer coincides with a real address stored in the purge address stack and the address translation lookaside buffer entry is registered before the partial purge request is given.

Thus, the present invention processes the plurality of partial purge request stored in the purge address stack simultaneously and hence the operation for the partial purging of the address translation lookaside buffer can be achieved in a reduced effective processing time. When carrying out a normal address translating process, the sequence of the normal address translating process can be assured because the address translation lookaside buffer entry specified by the partial purge request has already been invalidated.

BRIEF DESCRIPTION OF THE DRAWINGS

The above and other objects features and advantages of the present invention will become more apparent from the following description taken in connection with the accompanying drawings, in which:

FIG. 3 is a truth table showing truth values defining the function of an encoder employed in the data processing system of FIG. 2;

FIG. 4 is a truth table showing truth values defining the function of a decoder employed in the data processing system of FIG. 2.

DESCRIPTION OF THE PREFERRED EMBODIMENTS

Figure 1:
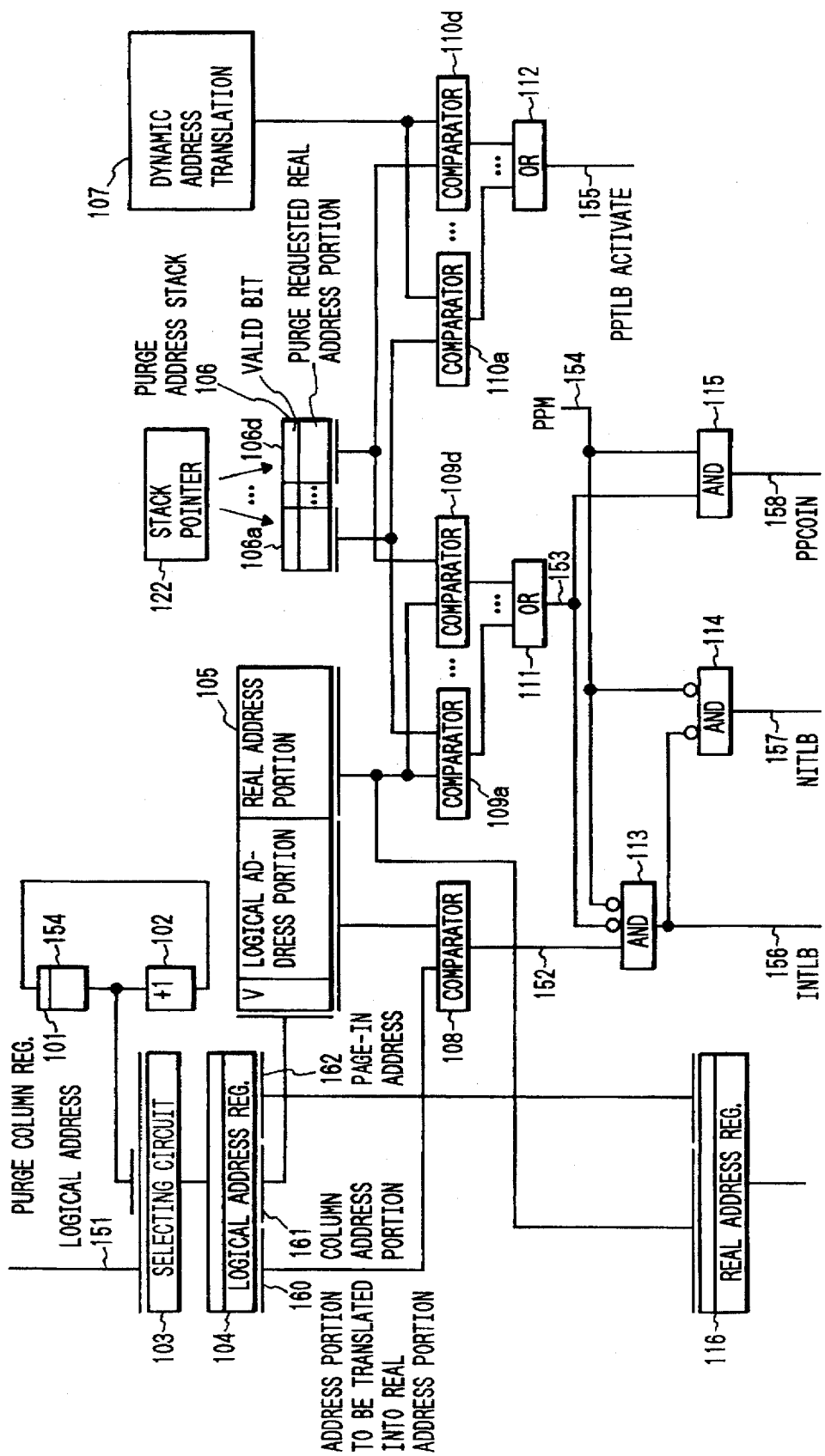
FIG. 1 is a block diagram of an address translation lookaside buffer and the associated circuitry included in a data processing system in a first embodiment according to the present invention.

Shown in FIG. 1 are a purge column register 101, a selecting circuit 103, a logical address register 104, an address translation lookaside buffer 105, a purge address stack 106, a dynamic address translator 107, comparators 108, 109a to 109d and 110a to 110d, OR gates 111 and 112, AND gates 113 to 115, and a real address register 116.

The purge address stack 106 includes four registers 106a to 106d each having a purge requested real addresses portion and a valid bit. When a partial purge request is given, a stack pointer 122 validates the valid bit of the register 106a of the purge address stack 106 and a purge request real address is set in the register 106a. When another partial purge request is given, the register 106b is validated and a purge request real address is set in the register 106b. Thus, the registers 106a to 106d are validated sequentially when partial purge requests are given, and purge request real addresses are set in the registers 106a to 106d. When the register 106d is validated and the partial purge request address is set in the register 106d, that is, when the purge address stack 106 is full, the address translation lookaside buffer 105 starts a partial purge process. After the partial purge process has been completed, the stack pointer 122 is reset to specify the register 106a.

The address translation lookaside buffer 105 has a plurality of entries each holding data consisting of a logical address portion, a real address portion and a valid (V) bit. The column address portion of the logical address register 104 is decoded to select the entry. The address translation lookaside buffer 105 is a conventional one known, for example, as TBL disclosed in U.S. Pat. No. 5,027,777, which is incorporated by reference thereto.

A normal process of gaining access to the address translation lookaside buffer 105 of the data processing system in the first embodiment will be described hereinafter.

A logical address specified by an address translation request given by a host system is transmitted through a signal line 151 to the selecting circuit 103 and is set in the logical address register 104. Access to the address translation lookaside buffer 105 is made by the column address portion 161 of the logical address register 104 to read the logical address portion, the real address portion and the V bit of the column (entry). The comparator 108 compares the logical address portion read from the address translation lookaside buffer 105 with the address portion 160 to be translated into a real address portion of the logical address register 104. If the logical address portion coincides with the address portion 160 and the V bit read from the address translation lookaside buffer 105 is valid, a signal in the 1 state is provided on a signal line 152. At the same time, the comparators 109a to 109d compares the real address portion read from the address translation lookaside buffer 105 with purge request real addresses stored in the registers, 106a to 106d of the purge address stack 106. If the real address portion coincides with any one of the purge request real address and the valid bit of the register storing the purge request real address coinciding with the real address portion is valid, the OR gate receiving the output signals of the comparators 109a to 109d provides a signal in the 1 state on a signal line 153.

Meanwhile, a partial purge mode signal (PPM signal) 154 provided by the host system is in the 1 state during the partial purge process. Therefore, the PPM signal 154 is in the 0 state during ordinary access to the address translation lookaside buffer 105. Accordingly, the AND gate 113 gives an INTLB signal 156 indicating that a necessary address translation pair has been read from the address translation lookaside buffer 105 to the host system as an output, when the signal on the signal line 152 connected to the output of the comparator 108 is in the 1 state and the signal on the signal line 153 connected to the OR gate 111 is in the 0 state. An address portion 162 in the page of the logical address register 104 is added to the real address portion (real page address) read from the address translation lookaside buffer 105 to obtain a real address, and then the real address is stored in the real address register 116.

When the signal on the signal line 152 connected to the output of the comparator 108 is in the 0 state, which indicates a state where no address translation pair associated with the logical address given to the logical address register 104 is found in the address translation lookaside buffer 105, the INTLB signal 156 is not provided. When the signal on the signal line 153 connected to the OR gate 111 is in the 1 state, which indicates a state where the address translation pair read from the address translation lookaside buffer 105 is the address translation pair specified by the partial purge request, the INTLB signal 156 is not provided.

When the PPM signal 154 is in the 0 state and the INTLB signal 156 is not provided, the AND gate 114 gives a NITLB signal (a signal indicating that no necessary address translation pair is found in the address translation lookaside buffer 105) 157 to the host system, and then the host system actuates the dynamic address translator 107. A real address determined by the dynamic address translator 107 is compared with the purge request real addresses stored in the registers 106a to 106d of the purge address stack 106 by the comparators 110a to 110d respectively. If the real address coincides with any one of the purge request real addresses and the valid bit of the register storing the purge request real address coinciding with the real address determined by the dynamic address translator 107 among the registers of the purge address stack 106 is valid, a PPTLB start signal 155 provided by the OR gate 112 receiving the output signals of the comparators 110a to 110d becomes the 1 state.

The real address portion determined by the dynamic address translator 107 is paired with a logical address portion on the line 160 from the logical address register 104 to form an address translation pair, and the address translation pair is registered in the entry of the address translation lookaside buffer 105 having the column address portion 161 of the logical address register 104 as a column address by a registering means, not shown. However, when the PPTLB start signal 155 is in the 1 state, this registering process is executed after the partial purge process is started and purging has been completed.

Since the data processing system in the first embodiment executes the partial purge process before registering the entry of the address translation lookaside buffer 105, an entry registered after a purge request is not looked upon as invalid. The partial purge process for purging a specified real address registered in the address translation lookaside buffer 105 is started also when the registers 106a to 106d of the purge address stack 106 becomes full.

The partial purge process will be described hereinafter. Once the partial purge process is started, the PPM signal 154 provided by the host system becomes the 1 state and the purge column register 101 is initialized. The purge column address of the purge column register 101 is given through the selecting circuit 103 to and stored in the logical address register 104, and then the address translation lookaside buffer 105 reads the logical address portion, the real address portion and the V bit of the associated column (column 0). The comparators 109a to 109d compare the real address portion read from the address translation lookaside buffer 105 with the purge request real addresses stored in the registers 106a to 106d of the purge address stack 106 respectively. If the real address portion coincides with any one of the purge request real addresses and the valid bit of the register storing the purge request real address coinciding with the real address portion is valid, the OR gate 111 receiving the output signals of the comparator 109a to 109d provides a 1-state output signal on the signal line 153. Since the partial purge process is started and the PPM signal 154 is in the 1 state, the AND gate 115 provides a partial purge coincidence signal (PPCOIN signal) 158 to start purging the address translation lookaside buffer 105 and the V bit of the relevant column (column 0) of the address translation lookaside buffer 105 is invalidated. The operation for purging the address translation lookaside buffer 105 is not started unless the 1-state signal is provided on the signal line 153.

The output operation for the column 0 has been completed, a +1 circuit 102 sets a purge column address, namely, the content of the purge column register 101, to +1. The purge column address is transferred through the selecting circuit 103 to and stored in the logical address register 104, and access is made to the next column (column 1) of the address translation lookaside buffer 105 for partial purging. Similarly, access is made sequentially to all the columns (all the entries) of the address translation lookaside buffer 105 and the partial purge process is repeated for all the columns. After the partial purge process has been executed for all the entries of the address translation lookaside buffer 105, the PPM signal 154 becomes the 0 state and a stack pointer for the purge address stack 106 is reset so as to specify the register 106a.

Since the data processing system in the first embodiment is capable of collectively carrying out a plurality of cycles of the partial purge process for the plurality of purge requests requesting purging the S address translation lookaside buffer 105, the effective time necessary for carrying out the partial purge process for the address translation lookaside buffer 105 can be reduced, whereby the processing efficiency of the data processing system can be improved.

Since the address translation lookaside buffer of the data processing system in the first embodiment is able to use a large-capacity RAM without dividing the same along the columns, the address translator can be formed in a high degree of integration and the reduction of the quantity of the hardware is possible.

Although the data processing system in the first embodiment described herein has the purge address stack comprising the four registers and is able to hold four purge requests, the number of the registers of the purge address stack need not necessarily be limited to four; the purge address stack may comprise an optional number of registers.

Figure 2:
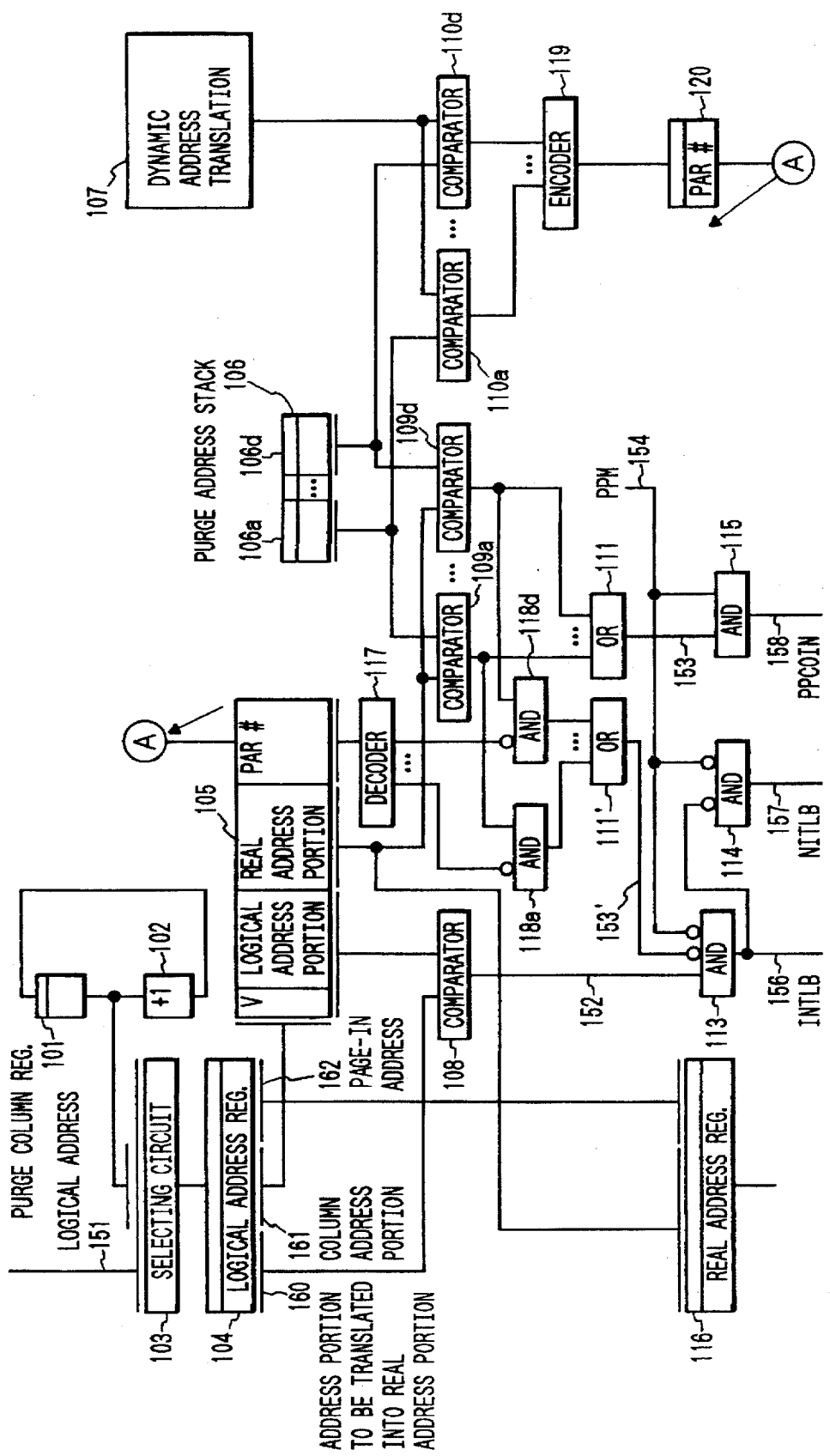
FIG. 2 is a block diagram of a data processing system in a second embodiment according to the present invention.

FIG. 2 is a block diagram of the configuration of an essential portion of a data processing system in a second embodiment according to the present invention, FIG. 3 is a truth table showing truth values defining the function of an encoder employed in the second embodiment and FIG. 4 is a truth table showing truth values defining the function of a decoder employed in the second embodiment. The second embodiment is provided with a storage means for storing the order of registration of the entry of an address translation lookaside buffer and the register of a purge address stack. Shown in FIG. 2 are an OR gate 111', a decoder 117, AND gates 118a to 118d, an encoder 119 and a register number register 120. In FIG. 2, parts like or corresponding to those shown in FIG. 1 are denoted by the same reference characters.

The second embodiment is substantially similar in configuration to the first embodiment except that the second embodiment differs from the first embodiment in that an address translation lookaside buffer 105 employed in the second embodiment stores, together with an address translation pair, the number PAR# of the largest register among those of a purge address stack holding the real address determined by an address translator 107 when the real address determined by the address translator 107 coincides with a real address which has already been specified by a purge request.

In the second embodiment, suppose that a real address is determined by the address translator 107. Then, the real address determined by the address translator 107 is compared with purge request real addresses stored in the registers 106a to 106d of the purge address stack 106 by the comparators 110a to 110d. If the real address coincides with any one of the purge request real address and the register storing the purge request real address coinciding with the real address is valid, the encoder 119 determines the number PAR# of the largest register among those of the purge address stack storing the purge request real addresses coinciding with the real address and encodes the number PAR#. The number PAR# of the register is registered together with the address translation pair in the address translation lookaside buffer 105.

In the second embodiment, the partial purge process is not started even if the output signals of the comparators 110a to 110d indicate the coincidence of the purge request real addresses with the real address, and the registers of the purge address stack 106 storing the purge request real addresses coinciding with the real address are valid.

The number PAR# of the register registered together with the address translation pair in the address translation lookaside buffer 105 indicates that registered address translation pair was changed after the registration of a partial purge request for the resister of the number PAR# of the purge address stack 106.

The encoder 119 determines the number of the register to be provided on the basis of truth values shown in FIG. 3. When a purge request is stored in the register 106d of the purge address stack 106, the partial purge process is started as explained previously in connection with the first embodiment. The output signal of the comparator 110d never indicates the 1 state and the Number PAR# never becomes "4".

A normal procedure of access to the address translation lookaside buffer 105 in the second embodiment will be described hereinafter.

The logical address of an address translation request given by a host system is given by the same procedure as that executed by the first embodiment, and the column address portion 161 of the logical address register 104 gains access to the address translation lookaside buffer 105 and reads the logical address portion, the real address portion, the V bit and the PAR# portion of this column (entry). The comparators 109a to 109d compares the real address portion read from the address translation lookaside buffer 105 with purge request real addresses read from the valid registers of the purge address stack 106 and gives output signals to the AND gates 118a to 118d respectively. The decoder 117 decodes the PAR# read from the address translation lookaside buffer 105 and the output signal of the decoder 117, i.e., a decoded signal, is given to the AND gates 118a to 118d respectively. The real address portion of the address translation lookaside buffer 105 is not invalidated and a real address is determined on the basis of the real address portion even if the output signal of some one of the comparators 109a to 109d indicates coincidence and is "1", when the AND gates 118a to 118d are closed by the decoded signal produced by the decoder 117 by decoding the PAR# read from the address translation lookaside buffer 105 and the coincidence signals delivered by the comparators 109a to 109d are not delivered through the AND gates 118a to 118d to a signal line 153' and the coincidence signals are not "1". In this case, the address translation pair read from the address translation lookaside buffer 105 was changed after the registration of a purge request for the register having the number PAR# of the purge address stack 106 and hence the address translation pair is valid. The real address can thus be determined by using the real address portion of the address translation pair.

The decoder 117 decodes PAR# according to truth values shown in FIG. 4. Each output signal of the decoder 117 indicates that the entry of the address translation lookaside buffer 105 was registered after a purge request for the register of the purge address stack 106 associated with the AND gate connected to the output of the decoder 117. The signal line 153' is in the 1 state when the real address portion read from the address translation lookaside buffer 105 coincides with any one of the valid purge request real addresses stored in the registers 106a to 106d of the purge address stack 106 and the entry of the address translation lookaside buffer 105 is registered before the purge request real address coinciding with the real address portion.

Thus, the second embodiment has the capability, in addition to that of the first embodiment, of determining the real address more efficiently than the previously described first embodiment by using the address translation lookaside buffer and of reducing the frequency of partial purge process to operate in an improved processing efficiency.

Since the partial purge process to be carried out by the second embodiment is the same as that carried out by the first embodiment and PAR# is not compared with any signal, the entry of the address translation lookaside buffer registered after a purge request is invalidated. Therefore, all the PAR# of the address translation lookaside buffer 105 are initialized by the partial purge process.

Although information about which of the entry of the address translation lookaside buffer and the register of the purge address stack has more recently registered is stored in the address translation lookaside buffer in the second embodiment, the information may be stored in the purge address stack or another device.

Figure 5:
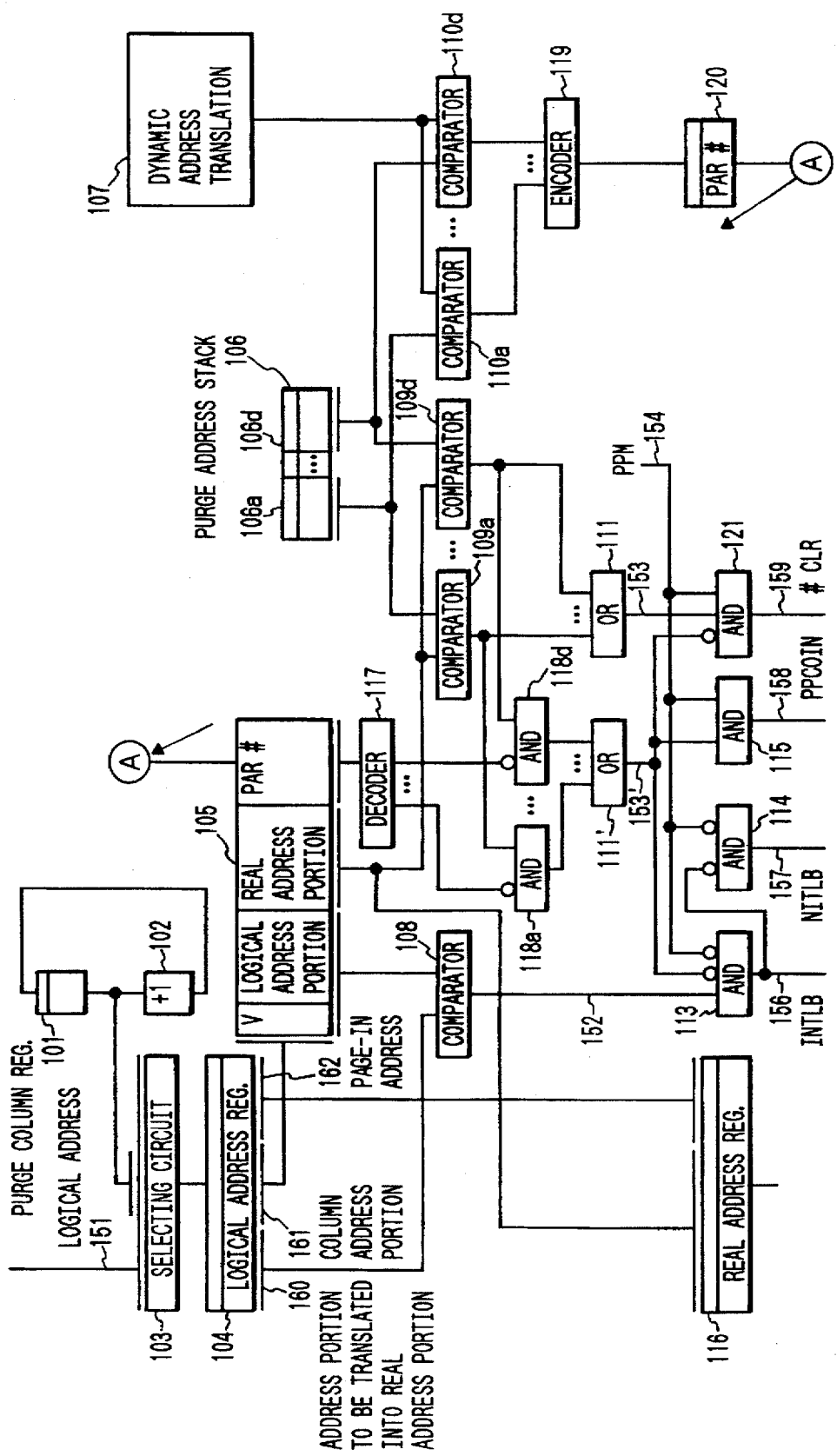
FIG. 5 is a block diagram of a data processing system in a third embodiment according to the present invention.

FIG. 5 is a block diagram of an essential portion of a data processing system in a third embodiment according to the present invention, which is a modification of the second embodiment. The a partial purge process to be executed by the third embodiment does not invalidate the entry of an address translation lookaside buffer registered after a purge request. Parts in FIG. 5 like or corresponding to those shown in FIGS. 1 and 2 are denoted by the same reference characters. In FIG. 5, indicated at 121 is an AND gate. Since the third embodiment is substantially the same in configuration as the second embodiment except that the third embodiment is provided with thee gate 121 that provides a signal inhibiting the invalidation of the entry of the address translation lookaside buffer registered after a purge request, the description of the constitution of the third embodiment will be omitted and only the partial purge process will be described.

Referring to FIG. 5, the PPM signal 154 is held in the I state during the partial purge process. The comparators 109a to 109d compare a real address portion read from the address translation lookaside buffer 105 with the valid purge request real addresses of the registers 106a to 106d of the purge address stack 106 to see which of the valid purge request real addresses coincide with the real address portion. If a signal line 153' that indicates that the entry of the address translation lookaside buffer 105 is registered before the purge request real addresses coinciding with the real address portion is in the 1 state, the AND gate 115 provides a PPCOIN signal 158 to start the partial purge process. When the real address portion read from the address translation lookaside buffer 105 coincides with any one of the valid purge request real addresses of the registers 106a to 106d, the signal line 153' that indicates that the entry of the address translation lookaside buffer 105 105 is registered before the purge request real addresses coinciding with the real address portion is in the 0 state and the signal line 153 that indicates that the real address portion read from the address translation lookaside buffer 105 coincides with any of the valid purge request real addresses of the registers 106a to 106d is in the 1 state, the AND gate 121 provides a #CLR signal 159. Only the purge address stack register number portion of the entry of the address translation lookaside buffer 105 is reset by the #CLR signal 159 provided by the AND gate 121. Since the third embodiment need not purge the address translation pair stored in the address translation lookaside buffer 105 and changed after the purge request by the partial purge process, the third embodiment is capable of carrying out the partial purge process more efficiently than the first and the second embodiment.

As is apparent from the foregoing description, according to the present invention, a plurality of partial purge requests requesting the partial purging of the address translation lookaside buffer are accumulated, and a plurality of cycles of the partial purge process for the plurality of partial purge requests are executed collectively, the effective time necessary for the partial purge process can be reduced and the data processing system processes data in an improved processing efficiency. Since the address translation lookaside buffer of the data processing system of the present invention employs a large-capacity RAM, the data processing system can be formed in an IC of a high degree of integration and the quantity of the hardware is comparatively small.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A data processing system provided with an address translator for translating logical addresses into corresponding real addresses and an address translation lookaside buffer for storing a plurality of entries each of an address translation pair of a logical address portion and a real address portion determined by the address translator, comprising a purge address stack for storing a plurality of real addresses to be invalidated for the entries of the address translation lookaside buffer to execute a plurality of cycles of partial purge process for the partial purging of the address translation lookaside buffer collectively for partial purge requests accumulated in the purge address stack.

2. A data processing system according to claim 1, wherein the partial purge process is started when the purge address stack becomes full.

3. A data processing system according to claim 1, wherein a decision means is provided to compare the real address portion read from the address translation lookaside buffer with the contents of the purge address stack and decide whether or not the accessed entry is that specified previously by a partial purge request, when gaining normal access to the address translation lookaside buffer, and the accessed entry of the address translation lookaside buffer is invalidated when the decision means decides that the accessed entry is that specified previously by a partial purge request.

4. A data processing system according to claim 1, wherein a decision means is provided to compare, when registering an address translation pair of a logical address portion and a real address portion determined by the address translator in the address translation lookaside buffer, the determined real address portion with the contents of the purge address stack and decide whether or not the real address portion to be stored in the address translation lookaside buffer is that specified previously by a partial purge request, and a plurality of cycles of the partial purge process are executed collectively for the partial purge requests accumulated in the purge address stack before registering a new entry in the address translation lookaside buffer, when the decision means decides that the real address portion to be stored in the address translation lookaside buffer is that specified previously by a partial purge request.

5. A data processing system according to claim 3, wherein a decision means is provided to decide whether or not each entry of the address translation lookaside buffer is that has been registered before each purge request stored in the purge address stack and storing the decision, and, when gaining normal access to the address translation lookaside buffer, the entry of the address translation lookaside buffer is decided to be valid when it is decided that the entry of the address translation lookaside buffer is that registered after a purge request requesting the partial purge of the address translation lookaside buffer, even if it is decided that the real address portion of the entry of the address translation lookaside buffer is that specified by the partial purge request.

6. A data processing system according to claim 1, wherein a decision means is provided to compare, when registering a pair of a logical address portion and a real address portion determined by the address translator in the address transla- tion lookaside buffer, the determined real address portion with the contents of the purge address stack and decide whether or not the real address portion to be stored in the address translation lookaside buffer is that specified by a partial purge request, and, when it is decided that the real address portion to be stored in the address translation lookaside buffer is that specified by the partial purge request, a fact that a new entry of the address translation lookaside buffer to be registered is that registered after the partial purge request stored in the purge address stack.

7. A data processing system according to claim 5, wherein, in the partial purge process in which the all the entries of the address translation lookaside buffer are searched one by one for real addresses portion specified by partial purge requests, the entry of the address translation lookaside buffer is not invalidated when it is decided that the entry of the address translation lookaside buffer is registered after the partial purge request stored in the purge address stack, even if the real address portion read from the address translation lookaside buffer is that specified by the partial purge request.

8. An address translation lookaside buffer controller in a data processing system which issues a partial purge request with a partial purge requested real address portion to an address translation lookaside buffer which has a plurality of entries each containing a logical address portion and a real address portion as an address translation pair, the system purging address portion pairs in response to a partial purge request which contain the same real address portion with the partial purge request, the controller comprising;

purge address stack having a plurality of registers each of which receives a partial purge requested real address portion;

means for successively reading the real address portion from the buffer;

a plurality of comparators connected to said registers respectively and to said buffer, whereby the comparators simultaneously receive and compare real address portions from the registers and the buffer;

means in response to result of the comparators for purging address translation pairs each of which is detected to contain the same real address portion that one of the registers stores.

9. A data processing system according to claim 3, wherein a decision means is provided to compare, when registering a pair of a logical address portion and a real address portion determined by the address translator in the address translation lookaside buffer, the determined real address portion with the contents of the purge address stack and decide whether or not the real address portion to be stored in the address translation lookaside buffer is that specified by a partial purge request, and, when it is decided that the real address portion to be stored in the address translation lookaside buffer is that specified by the partial purge request, a fact that a new entry of the address translation lookaside buffer to be registered is that registered after the partial purge request stored in the purge address stack.

* * * * *

UNITED STATES PATENT AND TRADEMARK OFFICE
CERTIFICATE OF CORRECTION

PATENT NO. : 5,710,903
DATED : January 20, 1998
INVENTOR(S) : Taiji Horiuchi et al.

It is certified that error appears in the above-indentified patent and that said Letters Patent is hereby corrected as shown below:

Column 5, line 54, delete "S"

Column 8, line 16, delete "I" and insert -- 1 --

Signed and Sealed this

Twenty-first Day of April, 1998

Attest:

BRUCE LEHMAN

Attesting Officer

Commissioner of Patents and Trademarks